United States Patent [19]

Vuckovich

[11] 4,053,355
[45] Oct. 11, 1977

[54] NUCLEAR REACTOR REMOTE DISCONNECT CONTROL ROD COUPLING INDICATOR

[75] Inventor: Michael Vuckovich, McKeesport, Pa.

[73] Assignee: The United States of America as represented by the United States Energy Research and Development Administration, Washington, D.C.

[21] Appl. No.: 621,994

[22] Filed: Oct. 14, 1975

[51] Int. Cl.² .................................................. G21C 17/00
[52] U.S. Cl. .............................. 176/19 R; 176/19 EC; 176/36 C
[58] Field of Search ..................... 403/27; 176/19, 36

[56] References Cited
U.S. PATENT DOCUMENTS 3,296,081  1/1967  Wildgoose ........................ 176/36 R

FOREIGN PATENT DOCUMENTS 965,014  7/1964  United Kingdom ............. 176/36 C

Primary Examiner—Samuel W. Engle
Assistant Examiner—S. A. Cangialosi
Attorney, Agent, or Firm—C. L. McHale; Michael S. Yatsko; Randall G. Erdley

[57] ABSTRACT

A coupling indicator for use with nuclear reactor control rod assemblies which have remotely disengageable couplings between the control rod and the control rod drive shaft. The coupling indicator indicates whether the control rod and the control rod drive shaft are engaged or disengaged. A resistive network, utilizing magnetic reed switches, senses the position of the control rod drive mechanism lead screw and the control rod position indicating tube, and the relative position of these two elements with respect to each other is compared to determine whether the coupling is engaged or disengaged.

10 Claims, 5 Drawing Figures

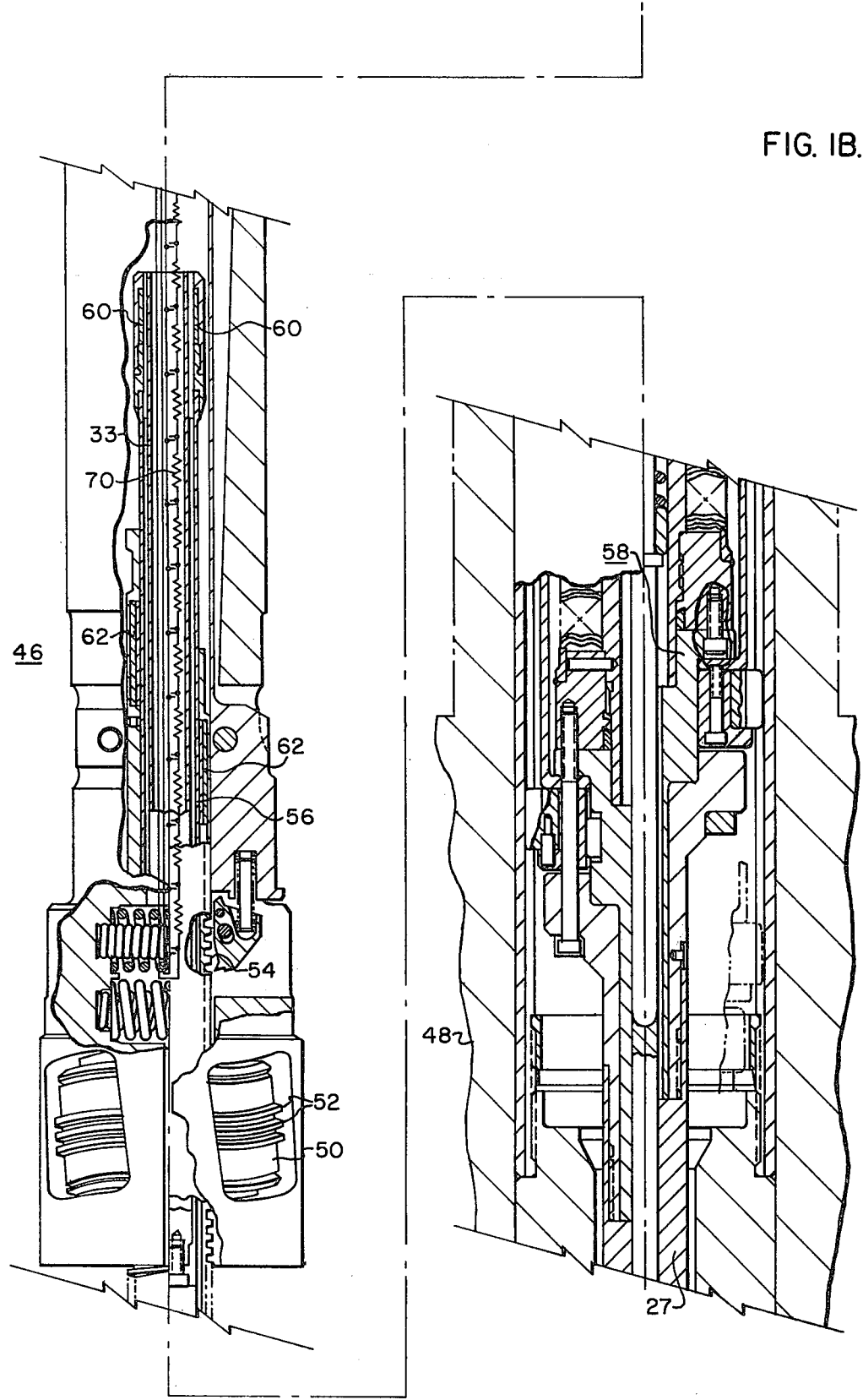
FIG. IB.

NUCLEAR REACTOR REMOTE DISCONNECT CONTROL ROD COUPLING INDICATOR

This invention was made during the course of, or under, a contract with the United States Energy Research and Development Administration, successor in interest to the United States Atomic Energy Commission.

BACKGROUND OF THE INVENTION

This invention pertains to control rods for nuclear reactors and more particularly to a coupling indicator for control rod assemblies having remotely disengageable couplings between the control rod and the control rod drive shaft.

A nuclear power plant generates electricity from heat produced by fissioning of a fissile material. The fissile material, or nuclear fuel, is contained within a fuel assembly; a plurality of fuel assemblies comprising a nuclear core. In order to extract the nuclear heat produced by fissioning of the fuel, the core is placed within a reactor vessel and a coolant, such as water or liquid sodium, is made to flow through the core so as to transfer the nuclear heat to the reactor coolant. The heated fluid is then used to generate steam which is used to drive conventional steam turbine-electrical generator apparatus.

Control of the reactor is usually achieved by control rods which are dispersed throughout the nuclear core and are mounted for movement into and out of the core. The control rods function by absorbing excess neutrons produced by the nuclear reaction; proper radial distribution of the control rods produces a substantially uniform power distribution across the core. On the other hand, proper axial positioning of the control rods permits the nuclear reactor to achieve design power levels.

Given the above nuclear, thermal, fluidic flow, and mechanical functions, and the attendant constraints and requirements associated therewith, it is readily understandable that a complicated and sophisticated structure for supporting the core, a sufficiently rigid coolant flow channeling means, and a precise control rod guide means are necessary within the reactor vessel. Moreover, since most typical commercial nuclear power plants are required to be refueled on the order of once every year, the complete apparatus within the reactor vessel is required to be disassembled in order to allow replacement of the nuclear fuel elements in the core. Since the reactor must be positively shut down during the refueling operations to comply with reactor safety standards, the control rods in the control rod guide means are often designed so as to be capable of being left in the core throughout reactor refueling. This, of course, even further complicates the design of the apparatus within the reactor vessel. In the prior art, the requirement of leaving the control rods in the nuclear core during refueling is achieved by providing a manually operated disconnect joint between the control rod and the control rod drive shaft. However, the disconnect joints are such that the reactor vessel must be unsealed to allow installation of a special tool which is used to manually actuate the disconnect joint, thereby uncoupling the control rod from the drive shaft. Manual actuation of the disconnect joint is also required to recouple the control rod through the drive shaft. While this prior art type of joint provides for high reliability, there are a number of disadvantages inherently associated with it. For example, a relatively large amount of time is required to wait for the reactor to cool down, both thermally and nuclearly, before the reactor vessel may be unsealed and personnel can safely pass; a relatively long amount of time is necessary for manually disconnecting each of the joints; and the long time required to manually disconnect the joints increases the radiation exposure of personnel working on the refueling.

To overcome the aforementioned problems, control rods are being designed which provide a disconnect coupling between a control rod and its drive shaft which have a high degree of reliability while allowing for remote coupling and uncoupling of the control rods from the drive shaft by utilizing the actuating force of the control rod drive mechanism. In utilizing this type of control rod, the precise relationship between the control rod and the drive shaft must be known at all times. The operator of the nuclear reactor system must know whether the control rod is coupled to the drive shaft, or whether the control rod is disengaged from the drive shaft. As an example of when this knowledge is necessary, during refueling operations, when it is desired to remove the drive shaft from the interior of the reactor vessel while maintaining the control rod within the core, the operator must know whether the drive shaft is disengaged, or uncoupled, from the control rods prior to removing the drive shaft from the reactor vessel.

SUMMARY OF THE INVENTION

The above-mentioned necessity is fulfilled by this invention by providing a coupling indicator for use with remotely disengageable control rod assemblies to determine the precise relationship between a control rod and its associated drive shaft. A position indicator tube is connected to a plunger which causes the engagement or disengagement of the drive shaft with the control rod. Magnets are attached both to the position indicator tube and to the control rod drive means. The magnets trip magnetic switches which are part of a resistive network for sensing the position of the two elements. Comparison of the position of the position indicator tube with respect to the movement of the drive means provides an indication as to whether the control rod is coupled or uncoupled from the drive shaft.

BRIEF DESCRIPTION OF THE DRAWINGS

Reference is now made to the description of the preferred embodiment, taken in connection with the accompanying drawings, in which:

FIGS. 1A, 1B, and 1C are a longitudinal sectional view of a control rod illustrating, to the left of the centerline, an uncoupled position, and to the right of the centerline a coupled position, of the control rod with the drive shaft;

DESCRIPTION OF THE PREFERRED EMBODIMENT

Figure 1A:
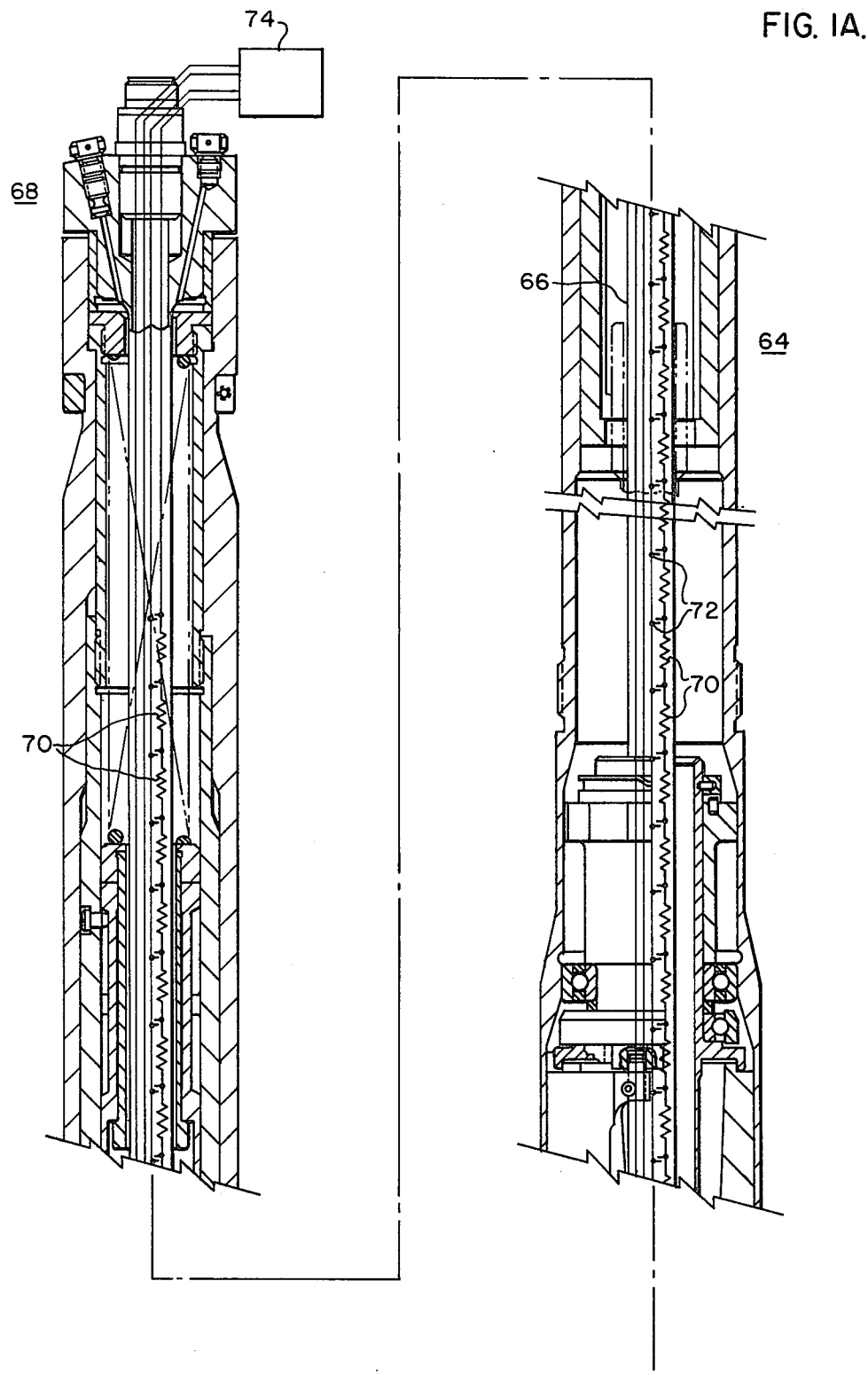

Throughout the description which follows, like reference characters indicate like elements in the various figures of the drawings.

Though not a part of this invention, an understanding of the operation of a remotely disengageable control rod would be helpful to an understanding of this invention. For a more detailed description of a remotely disengageable control rod, reference is made to an application for a patent for a "Control Rod For A Nuclear Reactor" by Walter Roman and Harry Sutton, Jr., Ser. No. 443,885, filed Feb. 19, 1974 now Defensive Publication T942,002 and assigned to the same assignee as the present invention.

Figure 1C:
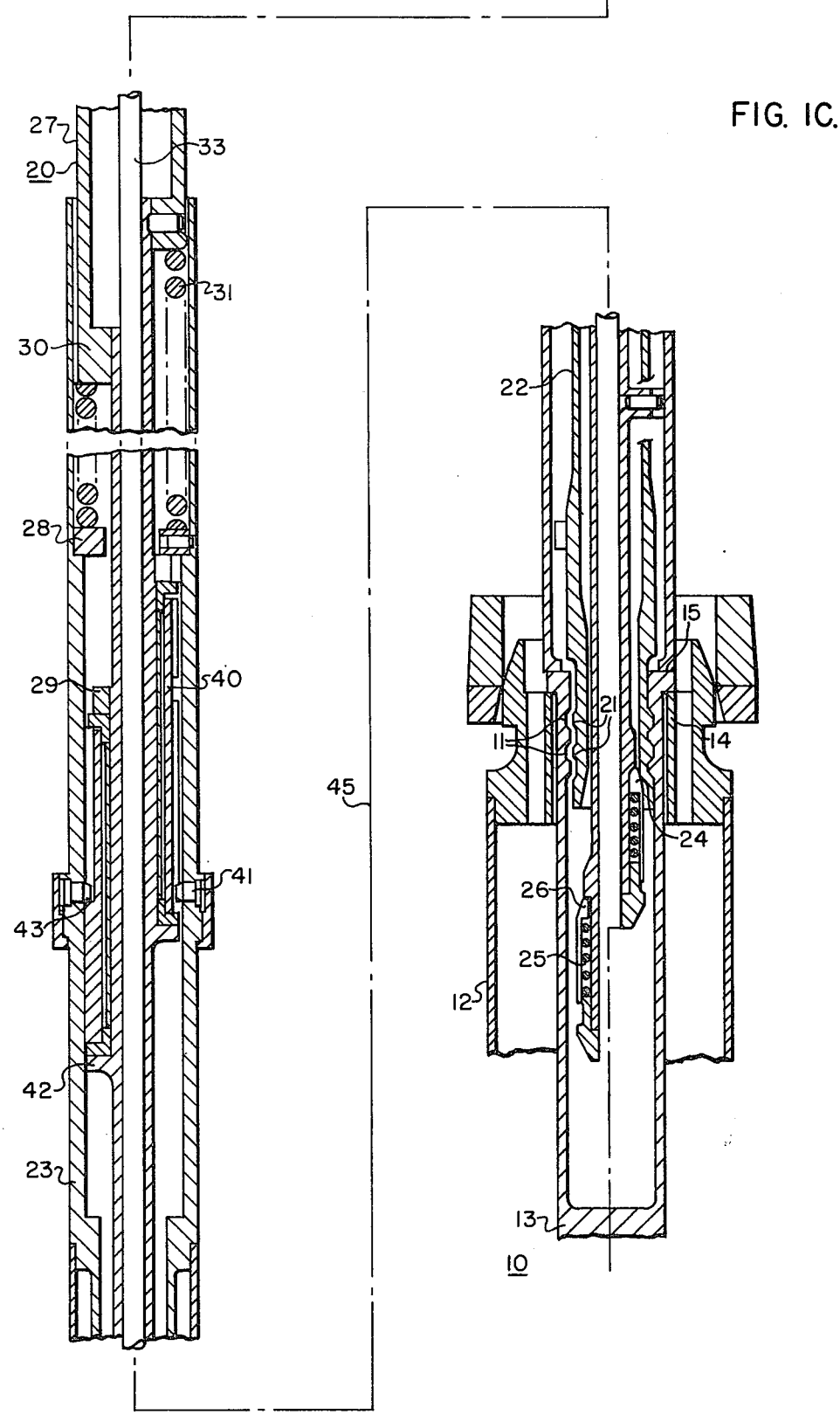

FIGS. 1A, 1B, and 1C illustrate one variation of a control rod assembly having a remotely disconnectable coupling between a control rod and a control rod drive shaft. The item having the reference character 13 represents an uppermost portion of an elongated control rod 10 adapted for movement within a control rod housing 12 which may be used with a water moderated nuclear reactor, a liquid-metal cooled nuclear reactor, or other such nuclear power plant. With the control rod 10 fully inserted in a reactor, the uppermost portion 13 will be supported by a ledge 14 in the collar of control rod housing 12 and will be positioned somewhat above the active section of a nuclear core (not shown). A drive shaft assembly 20, which is connected to the control rod 10, serves to transmit axial motion supplied by a control rod drive mechanism 46 to the control rod 10.

Although the reactor vessel is not shown, an arrangement is readily envisioned, whereby a plurality of coextensive control rods 10 and housings 12 are contained within a nuclear core and are totally enclosed by a reactor vessel, (the closure head of which is illustrated at 48) while each of the shaft assemblies 20 extending respectively from each control rod 10 sealingly penetrates the closure head 48, and a control rod drive mechanism 46 is mounted to each of the drive shaft assemblies 20 exteriorly of the reactor vessel, but within the sealed environment of the reactor containment.

As previously mentioned, the control rod drive mechanism 46 imparts axial motion to the control rod 10, the relative axial position of which, with respect to the core, controls the nuclear reaction and the power output. A fully inserted control rod 10 completely shuts down the reactor; a partially withdrawn control rod 10 serves to maintain the level of criticality required to achieve operating conditions. Hence, in order to prevent supercriticality, complete withdrawal of a control rod 10 must be accompanied by other measures which add neutron absorbers to shut down the nuclear reaction. The disconnect coupling between the control rod 10 and the drive shaft assembly 20 provides an alternative to the need for fully withdrawing the control rods 10 and adding neutron absorbers to the nuclear reactor in preparation for core refueling.

In the example illustrated in FIGS. 1A, 1B, and 1C the coupling between the control rod 10 and the control rod drive shaft 27 consists of the interlocking engagement of a plurality of protrusions with a plurality of grooves. The grooves 11 are formed within an opening in the upper part 13 of the control rod 10; the protrusions 21 are formed on the ends of resilient members 22 which extend from a cylindrical member 23. Resilient members 22, which may be manufactured by slitting an appropriately formed cylinder, are biased in a free position to be disengaged from the groove 11 within control rod 10. A plunger assembly 24, passing within an opening circumscribed by resilient members 22 and axially movable with respect thereto, is utilized to spread resilient members 22 into interlocking engagement with control rod 10. The plunger 24 may be equipped with a spring 25 and a sleeve 26 to assure smoothness of operation during spreading of the resilient members 22.

The relative positions of the plunger 24 and the resilient members 22 may be seen on the right of the centerline 45 when the coupling is engaged, and to the left of the centerline 45 when the coupling is disengaged. It is to be observed that the resilient members 22 and the plunger 24 are both attached to the drive shaft assembly 20. The plunger 24, however, is axially movable with respect to the resilient members 22. This is accomplished by forming the plunger 24 directly onto the end of the elongated drive shaft 27, while the resilients members 22 are fixedly connected to the cylindrical member 23 which is slidingly mounted onto the drive shaft 27. A flange member 28, attached to the cylindrical member 23 and extending radially inwardly therefrom, is positioned between the two flange members 29 and 30 which extend radially outwardly from the drive shaft 27. Thus, the cylindrical member 23 is permitted to telescope with respect to the drive shaft 27 but is prevented from sliding off the drive shaft 27. A helical spring 31 is positioned within the cylindrical member 23 and between flange members 28 and 30. The spring 31 serves to bias the relative positions of cylindrical member 23 and the drive shaft 27 in a manner which will be more fully understood as explained hereinafter.

When the control rod 10 is coupled to the drive shaft assembly 20, the free end of cylindrical member 23 is resting on top of a flange or surface 15 provided in the upper end 13 of the control rod 10. In order to uncouple the drive shaft from the control rod, the control rod assembly is driven first to its fully inserted position within the nuclear core so that the upper end 13 of control rod 10 rests on ledge 14 in the housing 12. Because of the sliding arrangement provided between cylindrical member 23 and the drive shaft 27, when the control rod assembly "bottoms out", the drive shaft 27 is capable of moving downward at additional incremental length. This extra downward motion of the drive shaft 27 causes the plunger 24 to move away from or axially downward with respect to the resilient members 22. Since the force overcoming the free position bias of the resilient members 22 is thereby removed, the control rod drive shaft 27 is disengaged from the control rod 10. Conversely, to couple the control rod 10 with the drive shaft 27, the plunger 24 must move toward or axially upward with respect to the resilient members 22. The spring 31, in conjunction with the capability of the cylindrical member 23 to move telescopically with respect to the drive shaft 27 provides the means for the interaction of the plunger 24 with the resilient members 22.

From the above, it will therefore be appreciated that the relative axial position of the plunger 24 with respect to the ends of the resilient members 22 determines whether or not the control rod 10 is coupled to the drive shaft assembly 20. Selection of either of these relative axial positions and positively locking the members in each of these positions is accomplished by sequencing members 40 and 41.

The sequencing member 40 comprises a cylindrical spool which is concentrically mounted to the plunger portion of the drive shaft 27. The mounting is such that the spool 40 may be rotated about the longitudinal axis of the drive shaft 27, but is prevented from moving axially with respect to the drive shaft 27. Flanges 29 and 42 prevent axial motion of the spool 40. The flange 42 is integrally formed with the plunger portion of the drive shaft 27; the flange member 29 is threaded onto the drive shaft 27 after assembly of the spool 40 to the drive shaft 27.

The sequencing members 41 comprise a plurality of pins which are fixedly attached to the cylindrical member 23. Although any number of pins 41 may be utilized, the example illustrated employs three pins with each pin being equidistantly spaced around the circumference of cylindrical member 23. The sequencing pins 41 are operationally connected to the sequencing spool 40 by fitting within grooves formed in the sequencing spool 40.

On the left side of the centerline 45, it is seen that the groove in sequencing spool 40 terminates at approximately mid-plane of the spool 40, forming a shoulder 43. With the sequencing pin 41 held against the shoulder 43 by the force exerted by the helical spring 31, the plunger 24 is axially displaced from resilient member 22, thereby disengaging the control rod 10 from the drive shaft 27. On the right side of the centerline 45, the groove in sequencing spool 40 extends the full length of the spool 40. With the pin 41 in this groove, the cylindrical member 23 is fully extended with respect to the drive shaft 27 such that the flange 28 is in contact with the flange 29. Also, the plunger 24 is drawn up within resilient members 22, forcing the resilient members 22 radially outwardly into engagement with the grooves 11 within the control rod 10, thereby coupling the control rod 10 with the drive shaft 27.

In accordance with the above, to move the resilient members 22 into engagement with the control rod 10, or conversely to move the resilient members 22 out of engagement with the control rod 10, it is necessary to move sequencing pin 41 from a half-length groove into a full-length groove or from a full-length groove to a half-length groove, respectively. For a detailed description of the means for accomplishing this movement, an understanding of which is not necessary for an understanding of the present invention, reference is made to the aforementioned Roman/Sutton application.

Figure 2:
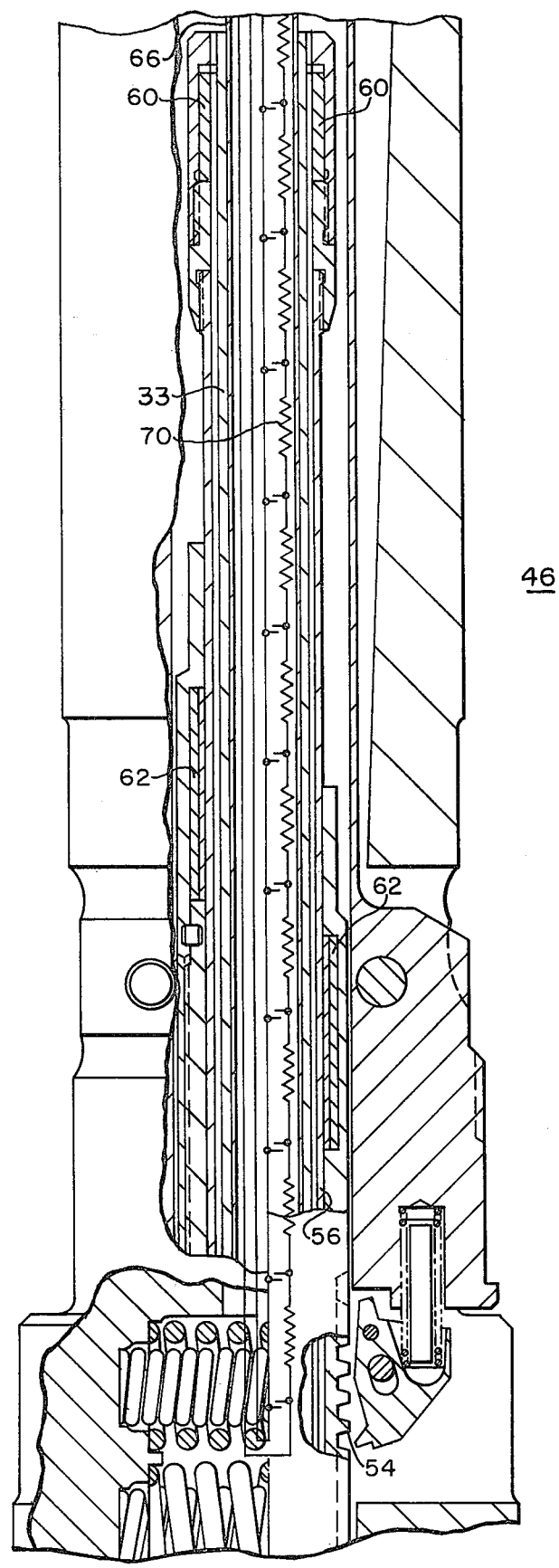
FIG. 2 is an enlarged sectional view of the drive means portion of the control rod shown in FIGS. 1A, 1B, and 1C.

As previously mentioned, axial movement of the control rod 10 is provided by the control rod drive mechanism 46 see FIG. 2. The control rod drive mechanism 46 imparts axial movement by means of a roller nut 50 which has a plurality of threads 52 which engage a plurality of gear teeth 54 of the control rod drive means 56, which in the preferred embodiment comprises a lead screw 56. The roller nut 50 is turned by means (not shown), in engagement with the lead screw teeth 54 which moves the lead screw 56 axially upwardly or downardly. The lead screw 56 is fixedly connected to the drive shaft 27 by connecting means 58. The lead screw 56 is of tubular configuration, and a position indicator tube 33 passes through the lead screw 56.

The position indicating tube 33, tubular in configuration, is fixedly secured to the plunger 24, passes axially through the drive shaft 27, and through the lead screw 56, and terminates adjacent the upper end of the control rod assembly. Magnets 60 are secured to the top of the position indicating tube 33. Additionally, magnets 62 are secured to the top of the drive means 56. Position indicating means 64 are located within the position indicating tube 33 within a position indicating guide tube 66. The position indicating guide tube 66, and the position indicating means 64 are fixedly secured to the top 68 of the control rod drive assembly, and do not have axial movement.

As illustrated, the position indicating means 64 are comprised of a plurality of resistances 70 serially connected, and a plurality of normally non-conducting magnetically activated switches 72 parallelly connected across each resistance 70. The position indicating means 64 is connected to position readout means 74 located externally of the control rod assembly.

Figure 3:
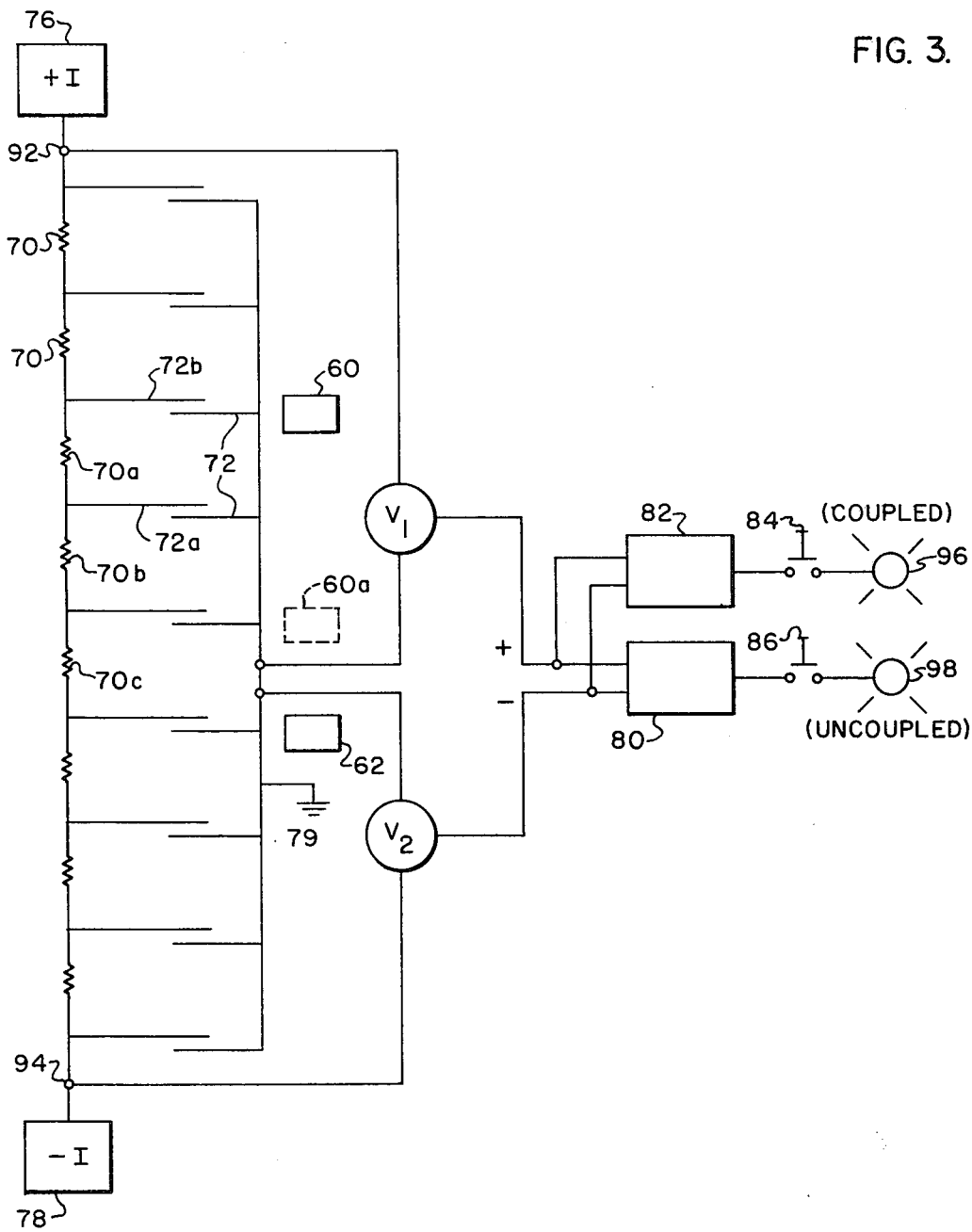
FIG. 3 is a schematic illustration of the position indicator system circuitry.

Referring now more particularly to FIG. 3, the serially connected resistances 70 are connected, at one end point 92, to a source of positive direct current 76, and at the opposite end point 94 to a source of negative direct current 78. The magnetically activated switches 72, such as reed switches, are parallelly connected across each resistance 70, and at the opposite end are connected to a common node 79. As is well known in the art, the position of the control rod 10 can be determined by means of the magnet 60 affixed to the position indicating tube 33. As the position indicating tube 33 moves axially with the control rod 10, the position indicating magnet 60 is aligned opposite one of the plurality of reed switches 72, thereby closing that reed switch 72. The current from the positive direct current source 76 flows through the resistances 70 until it reaches the reed switch 72 which has been closed by the magnet 60, then traverses through the reed switch 72 to the common node 79. The position of the control rod 10 is then determined by reading the resultant voltage between the current source 76 and common node 79. The voltage is the function of a number of resistances 70 through which the current flows. As shown in FIG. 3, if reed switch 72b is closed for example, the current from the positive current source 76 will flow through two resistances 70 before passing through the reed switch 72b and going to common node 79. As the amount of current flowing and the voltages are known, the amount of resistance can be determined from the formula $E = IR$, and with serially connected resistances being cumulative, and with the resistances 70 being equal, the total resistance R determined from the formula is then divided by the value of each individual resistance to determine how many resistances 70 the current passed through. As the reed switches 72 are located definite, spaced distances from a fixed point, the position of the position indicator tube 33, and thereby the control rod 10, is known because, by knowing how many individual resistances 70 the current flowed through, it is additionally known which reed switch 72 is opposite the position indicating magnet 60.

Similarly, the location of the drive means 56 can be determined by determining the position of the drive means magnet 62. A current source 78 having the opposite electrical polarity as the current source 76, or in other words, a negative polarity current, is connected to the opposite end 94 of the serially connected resistances 70. Then, as the drive means, or lead screw, magnet 62 closes one of the reed switches 72, the voltage is read between the negative current source 78 and the common node 79 to determine the position of the lead screw magnets 62. (As is well known in the art, current flows through a path of least resistance, so that even though two reed switches will be closed at one time, the current from each current source 76 and 78 will only flow to that reed switch closest to it. As the position indicating magnet 60 will always be between the lead screw magnet 62 and the end point 92, it will always be possible to determine the position of both the position indicating tube 33 and the lead screw 56.)

The circuit described for position indicating is also utilized to determine whether the control rod 10 is coupled or uncoupled from the control rod drive shaft 27. Irregardless of whether the control rod is coupled or uncoupled, when the lead screw 56 moves axially, the position indicating tube 33 will also move axially. However, as previously mentioned, the plunger 24 to which the position indicating tube 33 is connected, can be located in two positions; either engaging resilient members 22, thereby coupling the control rod 10; or it can be below resilient members 22, thereby being disengaged or uncoupled, the precise position of the plunger 24 being a function of whether the sequencing pin 41 is in a half-length groove or a full-length groove of the spool 40. The result of this two-position placement is that the position indicating tube 33 and the position indicating magnet 60, will be in one of two positions with respect to the drive means 56 during axial movement of the drive shaft 27. In other words, upon movement of the lead screw 56, the position indicating magnet 60 will be either close to, or farther away from the lead screw magnet 62. As shown in the drawing, if the control rod 10 is coupled, the plunger 24 will be vertically higher than it would be if uncoupled, the position indicating magnet 60 will correspondingly be higher, and the distance between the position indicating magnet 60 and the lead screw magnet 62 will be further apart than they would be if the control rod 10 was uncoupled.

This knowledge of the differing distances between the magnets can be utilized in the design of a coupled/uncoupled indicator. Referring to FIG. 3, the coupled configuration is illustrated by the use of the solid magnets 60 and 62, while the uncoupled relationship is illustrated utilizing the dashed magnet 60a. The voltage $V_1$, indicating the position of the position indicating magnet 60, and the voltage $V_2$ indicating the position of the lead screw magnet 62, are compared in the comparators 80 and 82. The difference in voltage between $V_1$ and $V_2$, or $\Delta V$, will then indicate though the indicating means 96, 98 whether the control rod is coupled or uncoupled when the pushbuttons 84, 86 are depressed. The comparators 80, 82 are voltage dependent bistable switches, or "flip-flops", which are in one of two states: either conducting or non-conducting, depending upon the voltage supplied to them. The comparator 82, for example, could be calibrated to indicate the coupled condition; in this instance, the comparator 82 would be calibrated such that, for input voltages equal to the voltage differential between $V_1$ and $V_2$ when the control rod 10 is coupled to the drive shaft 27, the comparator 82 will be conducting while, for voltage inputs equal to the voltage differential when uncoupled, the comparator 82 will be non-conducting. The comparator 80, which could be calibrated for the uncoupled configuration, would be calibrated such that, for voltage differences between $V_1$ and $V_2$ equal to that which occurs for the instance when the magnets 60a and 62 are together, the comparator 84 would be conducting while for voltages greater than this difference the comparator 80 would be non-conducting.

The movement of the lead screw 56 axially will not change the relationship between the magnets 60 or 60a, and 62, and the voltage differential between $V_1$ and $V_2$ will remain constant at a value dependent upon whether the control rod 10 is coupled or uncoupled. In the illustrative example shown in FIG. 3, for example, the voltage difference between $V_1$ and $V_2$ when the control rod 10 is coupled will always be that caused by the absence of the three resistances 70a, 70b, and 70c. This is true irregardless of where the lead screw 56 and its associated magnet 62 is along the length of the control rod assembly. In a like manner, the voltage difference between $V_1$ and $V_2$ when the control rod 10 is uncoupled, as indicated by magnet 60a, will be the voltage caused by the non-use of resistor 70c. Therefore, voltage differences between the coupled and uncoupled configurations will always be equivalent to the voltage drop caused by two resistances.

In addition to indicating whether the control rod is coupled or uncoupled, the information as to the coupling state of the control rod 10 can be utilized in the other reactor instrumentation. For example, the coupled comparator 82 could be electrically connected to the control rod out control such that the rods out instrumentation will be inhibited if the rod is beyond a specified position and coupled.

To achieve an even greater degree of accuracy, a like indicating means (not shown) can be positioned within the position indicating guide tube 66, on the opposite side of the tube 66, and axially spaced a distance from corresponding reed switches 72. For example, if the reed switches 72 shown in FIG. 2 are one inch apart, another series of resistors and reed switches can also be spaced one inch apart on the opposite side of the tube 66, but would be vertically spaced from their corresponding member a distance of one-half inch. In this manner, a more precise indication of position and coupling would occur.

Thus, the invention described provides a means for determining whether a control rod is coupled or uncoupled with the control rod drive shaft, thereby permitting the use of remotely disconnectable control rods.

I claim as my invention:

1. A coupling indicator system for use with remotely disengageable control rod assemblies wherein the connection of an elongated control rod to an elongated control rod drive shaft is dependent upon the longitudinal axial position of a plunger, one position of said plunger creating coupling between said control rod and said drive shaft, and a second position of said plunger creating uncoupling between said control rod and said drive shaft, said control rod assembly including a control rod drive means, movable along the drive shaft longitudinal axis, for axially moving said drive shaft along the drive shaft longitudinal axis, said coupling indicator system comprising:

means for determining the axial position of said plunger;

means for determining the axial position of said drive means; and means for comparing the axial position of said plunger with respect to the axial position of said drive means, said means for determining the axial position of said plunger comprising:

an elongated position indicator tube fixedly secured to and axially movable with, said plunger;

a position indicator magnet secured to said position indicator tube;

a plurality of equal resistances serially connected and having a first end point and a second end point;

a common node;

a plurality of normally non-conducting magnetically actuated switches parallelly connected between said resistances and said common node, one of said magnetically actuated switches being connected between each pair of adjacent resistances, said magnetically actuated switches being located such that at least one magnetically actuated switch is in magnetic communication with said position indicator magnet to cause such switch to conduct electric current;

a first current source having a first electrical polarity serially connected to said plurality of resistances at said first end point; and means for measuring the voltage generated between said first current source and said common node to obtain a first voltage.

2. The coupling indicator system according to claim 1 wherein a drive means magnet is secured to said drive means; and said means for determining the axial position of said drive means comprises means for determining the axial position of said drive means magnet.

3. The coupling indicator system according to claim 2 wherein said means for determining the axial position of said drive means magnet comprises:

a second current source having a second electrical polarity serially connected to said plurality of resistances at said second end point;

said drive means magnet being in magnetic communication with at least one of said magnetically actuated switches; and means for measuring the voltage generated between said second current source and said common node to obtain a second voltage.

4. The coupling indicator system according to claim 3 wherein said position indicator magnet is located intermediate the drive means magnet and said first end point.

5. The coupling indicator system according to claim 3 wherein said first electrical polarity and said second electrical polarity are electrically opposite.

6. The coupling indicator system according to claim 3 wherein said means for comparing the axial position of said plunger with respect to the axial position of said drive means comprises means for measuring the voltage differential between said first voltage and said second voltage.

7. The coupling indicator system according to claim 6 wherein said means for measuring the voltage differential comprise:

a voltage dependent first comparator, said first comparator being electrically conducting at voltages greater than a first predetermined input voltage and electrically non-conducting at voltages less than said first predetermined voltage input; and first means for indicating the electrical conduction of said first comparator, said voltage differential between said first voltage and said second voltage being a voltage input to said first comparator.

8. The coupling indicator system according to claim 7 wherein the voltage differential between said first voltage and said second voltage when said control rod is coupled to said drive shaft is greater than the voltage differential between said first voltage and said second voltage when said control rod is uncoupled from said drive shaft; and said first predetermined input voltage is less than the voltage differential between said first voltage and said second voltage when said control rod is coupled to said drive shaft and is greater than the voltage differential between said first voltage and said second voltage when said control rod is uncoupled from said drive shaft, whereby said first comparator is electrically conducting when said control rod is coupled.

9. The coupling indicator system according to claim 6 wherein said means for measuring the voltage differential comprise:

a voltage dependent second comparator, said second comparator being electrically non-conducting at voltages greater than a second predetermined input voltage and electrically conducting at voltages less than said second predetermined input voltage; and second means for indicating the electrical conduction of said second comparator, said voltage differential between said first voltage and said second voltage being a voltage input to said second comparator.

10. The coupling indicator system according to claim 9 wherein the voltage differential between said first voltage and said second voltage when said control rod is coupled to said drive shaft is greater than the voltage differential between said first voltage and said second voltage when said control rod is uncoupled from said drive shaft; and said second predetermined input voltage is greater than the voltage differential between said first voltage and said second voltage when said control rod is uncoupled from said drive shaft, and is less than the voltage differential between said first voltage and said second voltage when said control rod is coupled to said drive shaft, whereby said second comparator is electrically conducting when said control rod is uncoupled to said drive shaft.

* * * * *